United States Patent [19]

Barton et al.

[11] Patent Number: 5,750,220

[45] Date of Patent: May 12, 1998

[54] FUEL TANK AND A PROCESS FOR PRODUCING THE FUEL TANK

[75] Inventors: Roger Edgar Charles Barton; Johannes Clemens Maria Jordaan, both of CM Amsterdam, Netherlands

[73] Assignee: Shell Oil Company, Houston, Tex.

[21] Appl. No.: 655,364

[22] Filed: May 30, 1996

[30] Foreign Application Priority Data

May 30, 1995 [EP] European Pat. Off. ............. 95201403

[51] Int. Cl.$^6$ .................................................. B29D 22/00
[52] U.S. Cl. .................. 428/35.7; 220/4.13; 220/562; 264/331.11
[58] Field of Search ........................... 220/562, 4.13; 428/35.7; 264/331.11

[56] References Cited

U.S. PATENT DOCUMENTS

| | | | |
|---|---|---|---|
| 4,579,242 | 4/1986 | Ellis | 220/4.13 |
| 4,600,614 | 7/1986 | Lancaster et al. | 428/35 |
| 4,660,354 | 4/1987 | Lancaster et al. | 53/469 |
| 4,965,104 | 10/1990 | Barton et al. | |
| 4,985,278 | 1/1991 | George | |
| 5,186,200 | 2/1993 | Kimura et al. | 137/15 |
| 5,398,839 | 3/1995 | Kleyn | |

FOREIGN PATENT DOCUMENTS 571876   1/1993   European Pat. Off.

OTHER PUBLICATIONS

Patent Abstracts of Japan vol. 013, No. 025 (M-787), 20 Jan., 1989 & JPA-63/237,918 (Detsuku KK), 4 Oct., 1988.
Int. S/Report Oct. 9, 1996.

Primary Examiner—Melvyn I. Marquis
Assistant Examiner—D. Aylward

[57] ABSTRACT

A fuel tank is made by a process comprising injection molding a polyketone polymer into one or more parts of the tank and joining the parts of the tank together. The polyketone polymer is a copolymer of repeating units of the formula —CO—(CH$_2$—CH$_2$—)— and repeating units of the general formula —CO—(G)—, where G is a moiety originating from an olefinically unsaturated compound of at least 3 carbon atoms and the molar ratio of —CO—(G)— to —CO—(CH$_2$—CH$_2$—)— is between 0.02 and 0.15, and the copolymer has a limiting viscosity number, measured in m-cresol at 60° C., of between 1.4 and 2.0 dl/g; and said process.

6 Claims, No Drawings

FUEL TANK AND A PROCESS FOR PRODUCING THE FUEL TANK

FIELD OF THE INVENTION

The invention relates to fuel tanks and processes for producing such them.

BACKGROUND

It is known from U.S. Pat. No. 4,965,104 that linear alternating copolymers of carbon monoxide and an olefinically unsaturated compound, hereinafter also referred to as polyketones or polyketone polymers, possess a high stability in the presence of hydrocarbonaceous liquids and that they are therefore very suitable for use as containers for such materials. Many molding techniques are available for processing the copolymers into such containers. Examples of these techniques include blow molding, rotational molding, vacuum forming, injection molding and extrusion.

Blow molding is customarily employed in the production of fuel tanks and other containers typically requiring or having more than 1 l, in particular more than 10 l internal volume. In a blow molding processes a parison is first produced, which is a tube of molten polymer, from which a hollow object is subsequently formed by expanding the parison against the inner surface of a female mold. Impact performance of some containers made by this process is less than optimal. Those skilled in the art have sought improvements in this area particularly with respect to low temperature impact performance.

SUMMARY OF THE INVENTION

It has now been found that a fuel tank with an improved impact performance can be produced from a copolymer grade of polyketone which has a lower LVN and a higher melt index by using injection molding as the molding technique.

The injection molding process comprises injecting the molten polyketone polymer into a cooled mold after which the solidified molded part is removed from the mold. This process comprises injection molding a polymer composition containing a linear alternating copolymer of carbon monoxide and an olefinically unsaturated compound into one or more parts of the tank and joining the parts of the tank together. The copolymer comprises repeating units of the formula —CO—(CH$_2$—CH$_2$—)— and repeating units of the general formula —CO—(G)—, where G is a moiety originating from an olefinically unsaturated compound of at least 3 carbon atoms and the molar ratio of —CO—(G)— to —CO—(CH$_2$—CH$_2$—)— is between 0.02 and 0.15, and the copolymer has a limiting viscosity number, measured in m-cresol at 60° C., of between 1.4 and 2.0 dl/g.

Another aspect of the invention comprises a fuel tank made according to the process of this invention.

The improvement in performance obtained by practicing this invention is unexpected because the copolymer's lower LVN and higher melt index are consistent with a lower molecular weight while one skilled in the art would expect a polymer with a higher molecular weight to exhibit the better impact performance.

DETAILED DESCRIPTION OF THE INVENTION

In practicing the process of this invention it is preferred to use a polyketone polymer of which the molar ratio of —CO—(G)— to —CO—(CH$_2$—CH$_2$—)— is at least 0.03, and also to use a polyketone polymer which has an LVN of between 1.5 and 1.9 dl/g. It is more preferred to use a polyketone polymer having a molar ratio of —CO—(G)— to —CO—(CH$_2$—CH$_2$—)— of between 0.03 and 0.08 and also those having an LVN of between 1.6 and 1.8 dl/g. Most preferably the molar ratio of —CO—(G)— to —CO—(CH$_2$—CH$_2$—)— is between 0.03 and 0.08 and the LVN is between 1.6 and 1.8 dl/g. It has been found that the polyketone polymers selected in accordance with the present invention exhibit a very good balance of melt flow and, after injection molding, impact strength, which is very advantageous in the present molding process. This is particularly helpful in processes for producing large injection molded articles. The relevant melt flow properties can be measured, for example in accordance with ASTM D123882 (using a Davenport model 5 apparatus, 250° C., 1.0 kg load) and the impact strength can be assessed for example according to the ECE 34 Fuel Tank Test Protocol or ASTM D256-84 (using 63.5×12.5×6.5 mm samples with notch radius 0.25±0.12 mm).

The polyketone polymer to be used in the present invention has a linear alternating structure and contains one molecule of carbon monoxide for each molecule of ethene and the olefinically unsaturated compound. The units —CO—(CH$_2$—CH$_2$—)— and —CO—(G)— are found randomly throughout the polymer chain. The end groups of the polymer chain will depend upon the materials that are present during the production of the polymer and the purity or purification of the polymer. However, the precise physical properties of the polymers do not depend upon the particular end group to any considerable extent.

Olefinically unsaturated compounds on which G is based comprise typically up to 20 carbon atoms and include compounds which consist exclusively of carbon and hydrogen and compounds which in addition comprise hetero atoms, such as unsaturated esters, ethers and amides. Unsaturated hydrocarbons are preferred. Examples of suitable olefinic monomers are aliphatic α-olefins, such as propene, butene-1 and octene-1, cyclic olefins such as cyclopentene, aromatic compounds, such as styrene and α-methylstyrene, vinyl esters, such as vinyl acetate and vinyl propionate, and acrylate esters, such as methyl acrylate. Particularly preferred are propene and butene-1.

In determining the LVN of a polymer, four solutions are prepared by dissolving the polymer in four different concentrations at 60° C. in cresol. For each of these solutions the viscosity is measured in a viscometer at 60° C. relative to m-cresol at 60° C. If T$_o$ represents the outflow time of m-cresol and T$_p$ the outflow time of the polymer solution, the relative viscosity (η$_{rel}$) is obtained from η$_{rel}$=T$_p$/T$_o$. From η$_{rel}$ can be calculated the inherent viscosity (η$_{inh}$) according to the formula η$_{inh}$=(ln η$_{rel}$)/c where c represents the concentration of the polymer in grams per 100 ml solution. By plotting graphically the η$_{inh}$ found for each of the four polymer solutions against the corresponding concentration (c) and by then extrapolating to c=0, the intrinsic viscosity , ηin dl/g, is found. The Limiting Viscosity Number is also called the intrinsic viscosity.

Methods well known in the art can be employed for the determination of the molar ratio of —CO—(G)— to —CO—(CH$_2$—CH$_2$—)—. A very suitable technique is $^{13}$C-NMR. As the melting point of the polyketone polymer is dependent of the molar ratio of —CO—(G)— to —CO—(CH$_2$—CH$_2$—)—, it is also possible to determine this molar ratio by measuring the melting point of the polymer, e.g. by differential scanning calorimetry (DSC), and interpolation using a predetermined relation of the molar ratio and the melting point.

Methods for preparing polyketone polymers suitable for use in the present invention are well known in the art. A preparation method comprises contacting carbon monoxide and the olefinically unsaturated compounds in the presence of a catalyst composition formed from a palladium compound and a bidentate ligand of phosphorus. Other suitable preparation methods and process features which can be applied have been described in EP-A-307207, EP-A-181014, EP-A-121965, EP-A-391579, EP-A-314309 and EP-A-600554, EP-A-590042, EP-A-619335 and EP-A-616848.

The polyketone polymers of the present invention have an LVN of between 1.4 and 2.0 dl/g and a ratio of —CO—(G)— to —CO—(CH$_2$—CH$_2$—)— of between 0.02 and 0.15. A method to obtain such polyketone polymers comprises keeping the temperature during preparation between about 65° and 80° C., in most cases between about 68° and about 78° C. and by adding the appropriate amounts of carbon monoxide and olefinically unsaturated hydrocarbons. An appropriate amount for a polyketone based on carbon monoxide ethene and propene would comprise adding a molar ratio of propene to ethene of between 0.01:1 and 0.1:1. Preferred process conditions for obtaining the preferred polyketones comprise a temperature of between 68° and 78° C. a pressure of between 3.5 and 5.5 Mpa (35 and 55) bar and a molar ratio of propene to ethene of between 0.02:1 and 0.08:1.

The polyketone polymer composition which is injection molded will generally further contain stabilizers. The stabilizers which will usually be present are compounds which can improve one or more of the oxidative stability the melt stability and the UV stability. Stabilizers which give very good results have been described in EP-A-289077, EP-A-478088, EP-A-322043, and EP-A-326223.

Other common additives are fillers, extenders, lubricants, pigments (particularly, black pigments), plasticizers, and other polymeric materials to improve or otherwise alter the properties of the composition. These can be dispersed in the polyketone polymer matrix by a variety of methods known to those skilled in the art.

The polyketone polymer composition can further contain reinforcement materials such as glass fiber and mica. However, it is preferred not to have these present in the instant invention.

Injection molding comprises injecting the molten polyketone polymer composition out of a heated barrel into a cooled mold after which the polyketone polymer article is removed from the mold. The temperature and pressure at which the viscous polyketone polymer composition is preferably injected depends on further process features such as the form of the mold the polyketone polymer which is used and the desired properties of the injection molded article. In general, the temperature at which the polyketone polymer will be injected will be between 230° and 300° C.

Further injection molding process features which can be applied are the features which are known to be advantageous in the general field of injection molding.

The fuel tank according to this invention contains more than one part. At least one of the parts has been injection molded from the polyketone polymer Preferably there are two parts injection molded from the polyketone polymer. The fuel tank can be assembled by joining the parts together using methods known in the art. A preferred method for joining polyketone parts comprises welding of the parts which can be accomplished by heating the surfaces to be joined to a temperature above the melting point of the polyketone for example between 2° and 50° C. in particular between 5° and 40° C. above the melting point and subsequently pressing the parts together while cooling to a temperature below the melting point. A well known technique is hot-plate welding. Other techniques are vibrational welding also called high frequency welding and laser-beam welding. At one or both sides the contact surfaces to be welded together may be provided with a melt trap, i.e., a recess in the longitudinal direction of the weld to be made which can trap molten material formed during the welding. The weld width is suitably 1.3–2 times the thickness of the wall.

The properties of the polyketone polymers make that the fuel tanks can have relatively thin walls. Wall thicknesses of at least 1 mm in particular at least 1.5 mm and of at most 10 mm have been found to be suitable. For most applications wall thicknesses of between 2 and 6 mm are preferred. The internal volume of the fuel tank may vary between wide ranges but will typically be chosen between 1 and 1000, albeit that larger tanks are possible as well. Preferably the internal volume is between 10 and 300 l.

Producing fuel tanks in accordance with the present invention has additional advantages compared with employing blow molding techniques. Such advantages reside in a strict control of the wall thickness of the fuel tank and in the possibility of integrating support structures and extraneous pipes fittings etc., into the mold design. In a very advantageous embodiment of this invention parts of a fuel pump in particular the top and/or bottom parts of an assembly which contains a fuel pump and a fuel measuring device, are integrated into one or more injection molded parts of the fuel tank. This facilitates the production of a complete fuel system while allowing a reduction of the number of parts which have to be produced and assembled.

A further advantage of the present fuel tanks resides in their ease of disposal after use, in particular when compared with other plastic tanks which have been subjected to surface modification treatment e.g., fluorination, sulphonation, modification by plasma treatment for improving their barrier properties or which are composed of a multi-layer system of for example high-density polyethene with poly vinyl alcohol or polyamde-6.

The fuel tanks according to this invention my also be used for holding hydrocarbonaceous cooling liquids of cooling equipment for example of refrigerators and air conditioning equipment in particular equipment installed in a vehicle.

The present invention is illustrated by the following examples.

EXAMPLE 1

A linear alternating copolymer of carbon monoxide with ethene and propene having an LVN of 1.70 dl/g and a ratio of propene units to ethene units of 0.07 was injection molded into sets of the two halves of a 55 l prototype fuel tank. The average wall thickness was 4 mm. The following conditions were employed: temperature profile up to 280° C., cycle time 125° s, mold temperature 70° C., part weight 3500° g. Of each set the two halves were joined together by hot plate welding employing a Teflon coated hot plate at a temperature of 250° C. The Teflon coating served as an anti-sticking layer.

The tanks were impact tested at −40° C. using the procedures of the ECE°34 Fuel Tank Test Protocol (tank filled with glycol, conditioned for 12–15 hours at −40° C., impacted at vulnerable points with a tetrahedron shaped impactor of 15 kg, impact energy 30°J). The results were satisfactory.

EXAMPLE 2 (COMPARATIVE)

A linear alternating copolymer of carbon monoxide with ethene and propene having an LVN of 2.24 dl/g and a ratio of propene units to ethene units of 0.07 was extrusion blow molded into 3 l fuel tanks with an average wall thickness of 4 mm. The following conditions were employed: temperature profile up to 250° C., cycle time 52 s, mold temperature 80° C., part weight 660 g.

The fuel tanks were impact tested at −40° C. using the procedures outlined in Example 1. The tanks failed.

We claim as our invention:

1. A fuel tank comprised of more than one part, at least one of said parts being prepared by a process comprising injection molding a polymer composition containing a linear alternating copolymer of carbon monoxide and olefinically unsaturated compounds into one or more parts of the tank and joining the parts of the tank together; wherein said copolymer comprises repeating units of the formula —CO—($CH_2$—$CH_2$—)— and repeating units of the formula —CO—(G)—, G is a moiety originating from an olefinically unsaturated compound of at least 3 carbon atoms, the molar ratio of —CO—(G)— to —CO—($CH_2$—$CH_2$—)— is between 0.02 and 0.15, and the copolymer has a limiting viscosity number, measured in m-cresol at 60° C. of between 1.4 and 2.0 dl/g.

2. The fuel tank of claim 1, wherein the copolymer has the molar ratio of —CO—(G)— to —CO—($CH_2$—$CH_2$—)— between 0.03 and 0.08.

3. The fuel tank of claim 1 wherein the copolymer has a limiting viscosity number, measured in m-cresol at 60° C., of between 1.6 and 1.8 dl/g.

4. The fuel tank of claim 1 further comprising a fuel pump and a fuel level measuring device integrated into injection molded parts of the fuel tank.

5. A process for producing a fuel tank, comprising injection molding a polymer composition comprising a linear alternating copolymer of carbon monoxide and olefinically unsaturated compounds into one or more parts of the tank and joining the parts of the tank together; wherein said copolymer comprises repeating units of the formula —CO—($CH_2$—$CH_2$—)— and repeating units of the formula —CO—(G)—, G is a moiety originating from an olefinically unsaturated compound of at least 3 carbon atoms, the molar ratio of —CO—(G)— to —CO—($CH_2$—$CH_2$—)— is between 0.02 and 0.15, and the copolymer has a limiting viscosity number, measured in m-cresol at 60° C. of between 1.4 and 2.0 dl/g.

6. The process of claim 1 wherein said parts are joined together by welding.

* * * * *